United States Patent [19]

Aizawa et al.

[11] Patent Number: 5,609,954
[45] Date of Patent: Mar. 11, 1997

[54] STRIPPABLE PRESSURE-SENSITIVE ADHESIVE AND ADHESIVE MATERIAL USING THE SAME

[75] Inventors: Kaoru Aizawa; Michirou Kawanishi, both of Osaka, Japan

[73] Assignee: Nitto Denko Corporation, Osaka, Japan

[21] Appl. No.: 407,035

[22] Filed: Mar. 17, 1995

Related U.S. Application Data

[63] Continuation of Ser. No. 164,844, Dec. 9, 1993, abandoned, which is a continuation of Ser. No. 929,019, Aug. 13, 1992, abandoned.

[30] Foreign Application Priority Data

Aug. 14, 1991 [JP] Japan ................. 3-228861

[51] Int. Cl.$^6$ ................. B32B 5/22; B32B 7/06; C08J 9/16
[52] U.S. Cl. ................. 428/317.5; 428/339; 428/344; 428/346; 428/354; 428/355 RA; 521/56; 521/58; 521/60; 521/910
[58] Field of Search ................. 428/317.3, 317.5, 428/346, 344, 345, 354, 339, 355; 521/56, 58, 910, 60

[56] References Cited

U.S. PATENT DOCUMENTS

| | | | |
|---|---|---|---|
| 3,188,266 | 6/1965 | Charbonneau et al. | 428/345 |
| 3,920,877 | 11/1975 | Babber et al. | 428/345 |
| 4,828,881 | 5/1989 | Brown et al. | 428/40 |

FOREIGN PATENT DOCUMENTS

| | | |
|---|---|---|
| 5661468 | 5/1981 | Japan. |
| 6317981 | 1/1988 | Japan. |
| 6333487 | 2/1988 | Japan. |
| 2-305878 | 12/1990 | Japan. |

OTHER PUBLICATIONS

Translation of JP 63-17981 (in English).
Database WPIL, Week 9106, Apr. 10, 1991, Derwent Publications, Ltd. (Abstract); AN 91039634.
Patent Abstracts of Japan, vol. 5, No. 124 (C-66)(796), Aug. 11, 1981 (Abstract).
Database WPIL, Week 8704, Mar. 25, 1987, Derwent Publications, Ltd. (Abstract); AN 87-025179.
Database WPI, Week 8704, Mar. 25, 1987, Derwent Publications, Ltd. (Abstract); AN 87-025165.

*Primary Examiner*—Marion E. McCamish
*Assistant Examiner*—Blaine R. Copenheaver
*Attorney, Agent, or Firm*—Sughrue, Mion, Zinn, Macpeak & Seas

[57] ABSTRACT

A strippable pressure-sensitive adhesive and an adhesive material using the same are disclosed, adhesive comprising a highly elastic base polymer whose dynamic modulus of elasticity is in the range of from 250,000 to 10,000,000 dyne/cm$^2$ at a temperature between ambient temperature and 150° C. with a small rate of change with temperature, having incorporated therein a blowing agent, which adhesive reduces or loses its adhesiveness on expansion or blowing of blowing agent. The adhesive and adhesive material are easily re-applied, is capable of satisfactorily following the shape of an adherent during forming of the adherent, reduces its adhesiveness on heating, and is applicable to various adherents with excellent workability.

19 Claims, No Drawings

STRIPPABLE PRESSURE-SENSITIVE ADHESIVE AND ADHESIVE MATERIAL USING THE SAME

This is a continuation of application Ser. No. 08/164,844, filed Dec. 9, 1993, (now abandoned) which is a continuation of application Ser. No. 07/929,019 filed Aug. 13, 1992, now abandoned.

FIELD OF THE INVENTION

This invention relates to a strippable pressure-sensitive adhesive comprising a highly elastic polymer containing a blowing agent, which is easily stripped and re-adhered, closely follows the shape of an adherent during forming of the adherent, and reduces its adhesiveness on heating. The invention also relates to an adhesive material using the same.

BACKGROUND OF THE INVENTION

It has been long demanded to develop a strippable pressure-sensitive adhesive which is suitable for temporary fixing of ceramic sheets, electronic parts, etc. or for temporary surface protection of metallic plates, etc. and, after use, easily stripped off the adherent. Requirements for the strippable pressure-sensitive adhesives have been changing with the times and ever being made severer.

For example, there is a demand for a temporary fixing material which is easily re-adhered for re-positioning. The adhesive for this use is required to have sufficient adhesive strength for fixing of an adherent, such as a ceramic sheet or an electronic part, while capable of being released from the adherent without causing damage to the adherent for positional correction, and to be easily released from the adherent after use.

There is another demand for a surface protective material which tightly follows the shape of an adherent during forming, for example, drawing. For this use, the adhesive is required to hold an adequately controlled balance between adhesion and strippability while taking into consideration an increase of adhesive strength with time. Excessive adhesion makes smooth stripping after use impossible.

Known strippable pressure-sensitive adhesives include those comprising a base polymer having a small dynamic modulus of elasticity (200,000 dyne/cm$^2$ or less) at a high temperature (150° C.) having incorporated therein a blowing agent as disclosed in JP-A-56-61468 (the term "JP-A" as used herein means an "unexamined published Japanese patent application"). These adhesives, however, show insufficient reduction in adhesion for easy release. In some cases, they increase their adhesiveness when heat treated, for example, from 350 g/20 mm to 450 g/20 mm and are therefore unsatisfactory in strippability.

It has been proposed to use a polymer having a small dynamic modulus of elasticity at ambient temperature as a base polymer so as to improve the properties of reducing adhesion on heat treatment as disclosed in JP-A-61-174857. However, the adhesives exhibit so strong adhesion at ambient temperature that they cannot be stripped for re-adhesion without causing damage to an adherent, such as a ceramic sheet.

On the other hand, JP-A-63-17981 discloses an ultraviolet-curing pressure-sensitive adhesive containing a blowing agent, which undergoes curing and blowing on ultraviolet irradiation and heating. However, the range of application of this adhesive is greatly limited because an ultraviolet emitter is needed in addition to a heating apparatus, application to a large-sized adherent is difficult, and adhesiveness reduction treatment is difficult due to the problem of shadow. Further, it is necessary to adjust the balance between curing treatment and blowing treatment, making the operation complicated and inefficient.

SUMMARY OF THE INVENTION

An object of the present invention is to provide a strippable pressure-sensitive adhesive or adhesive material which is easily re-adhered at ambient temperature, which is capable of satisfactorily following the shape of an adherent during forming of the adherent, which reduces its adhesiveness on heating, and which is applicable to various adherents with excellent workability.

The inventors have found that a strippable pressure-sensitive adhesive obtained by using, as a base polymer, a highly elastic polymer having a high dynamic modulus of elasticity with a small rate of change with temperature from ambient temperature to a high temperature (150° C.) is strippable from an adherent, such as a ceramic sheet, without causing damage thereto, be easily re-adhered for positional correction or the like purpose, and satisfactorily follows the shape of an adherent on forming, such as drawing of a metal plate. They also found that incorporation of a blowing agent which expands or blows on heating into the base polymer provides a strippable pressure-sensitive adhesive which satisfactorily reduces or loses its adhesiveness on heating.

The present invention relates to a strippable pressure-sensitive adhesive comprising a highly elastic polymer base whose dynamic modulus of elasticity is in the range of from 250,000 to 10,000,000 dyne/cm$^2$ at a temperature between ambient temperature and 150° C. with a small rate of change with temperature, having incorporated therein a blowing agent, which adhesive reduces or loses its adhesiveness on expansion or blowing of said blowing agent.

The present invention also relates to a strippable pressure-sensitive adhesive material comprising a support having on at least one side thereof a pressure-sensitive adhesive layer comprising the above-described adhesive.

DETAILED DESCRIPTION OF THE INVENTION

The strippable pressure-sensitive adhesive of the present invention comprises, as a base polymer, a highly elastic polymer and is such that the adhesive force thereof before heat treatment is at least about 100 g/20 mm, preferably 200 to 2,500 g/20 mm, the adhesive force after heat treatmemt is about 300 g/20 mm or less, preferably 150 g/20 mm or less, and the percentage of adhesiveness reduction is at least about 50%, preferably 65% or more, and more preferably 75% or more. The highly elastic polymer to be used has a dynamic modulus of elasticity in the range of from 250,000 to 10,000,000 dyne/cm$^2$, and preferably from 500,000 to 8,000,000 dyne/cm$^2$, at a temperature of from ambient temperature to 150° C.

If the dynamic modulus of elasticity in the above temperature range is less than 250,000 dyne/cm$^2$, the adhesive force at ambient temperature is so high that the adhesive may not be easily stripped and re-adhered and the adhesiveness is not sufficiently reduced or, in some cases, rather increased on heating. If the dynamic modulus of elasticity exceeds 10,000,000 dyne/cm$^2$, the adhesive force at ambient temperature is insufficient, and the expansion or blowing of the blowing agent on heating is inhibited, causing a failure of appreciably reducing the adhesiveness.

The highly elastic polymer to be used in the present invention should have a small rate of change of dynamic modulus of elasticity with temperature between ambient temperature and 150° C. The rate of change is preferably within 5 times, and more preferably within 3 times.

The highly elastic polymer is not particularly limited in constituent monomer units, etc. Any of monomers employed in known pressure-sensitive adhesives, such as acrylic pressure-sensitive adhesives, rubber pressure-sensitive adhesives, and styrene-conjugated diene block copolymer pressure-sensitive adhesives, may be used.

Specific examples of usable monomers include (meth)acrylic esters having an alkyl group usually containing not more than 20 carbon atoms, such as methyl, ethyl, propyl, butyl, 2-ethylhexyl, isooctyl, isononyl, isodecyl, dodecyl, lauryl, tridecyl, pentadecyl, hexadecyl, heptadecyl, octadecyl, nonadecyl, and eicosyl groups; (meth)acrylic acid, itaconic acid, hydroxyethyl (meth)acrylate, hydroxypropyl (meth)acrylate, N-methylolacrylamide, (meth)acrylonitrile, glycidyl (meth)acrylate, vinyl acetate, styrene, isoprene, butadiene, isobutylene, and divinyl ether.

Natural rubber or reclaim rubber may also be used as a base polymer so long as the above-described elasticity characteristics are satisfied.

If desired and necessary, the pressure-sensitive adhesive of the present invention may further contain appropriate additives, such as crosslinking agents, tackifier resins, plasticizers, fillers, and antioxidants. It is however advantageous to use those additives such that the strippable pressure-sensitive adhesive has a gel content of 40% by weight or more, preferably 50% by weight or more, and more preferably 70% by weight or more.

The pressure-sensitive adhesive of the present invention contains a blowing agent. The blowing agent incorporated undergoes expansion or blowing on heating to render the adhesive less adhesive or non-adhesive. The amount of the blowing agent to be incorporated is decided appropriately depending on the desired degree of adhesiveness reduction. It usually ranges from 1 to 100 parts by weight, preferably from 5 to 50 parts by weight, and more preferably from 10 to 40 parts by weight, per 100 parts by weight of the base polymer.

The blowing agent which can be used in the present invention is not particularly limited, and various inorganic or organic blowing agents can be employed.

Typical examples of suitable inorganic blowing agents are ammonium carbonate, ammonium hydrogencarbonate, sodium hydrogencarbonate, ammonium nitrite, sodium borohydride, and azide compounds.

Typical examples of suitable organic blowing agents include water; alkane chlorofluorides, e.g., trichloromonofluoromethane and dichloromonofluoromethane; azo compounds, e.g., azobisisobutyronitrile, azodicarbonamide, and barium azodicarboxylate; hydrazine compounds, e.g., p-toluenesulfonyl hydrazide, diphenylsulfone-3,3'-disulfonyl hydrazide, 4,4'-oxybis(benzene sulfonyl hydrazide), and allyl bis(sulfonyl hydrazide); semicarbazide compounds, e.g., p-toluylenesulfonyl semicarbazide and 4,4'-oxybis-(benzene sulfonyl semicarbazide); triazole compounds, e.g., 5-morpholyl-1,2,3,4-thiatriazole; and N-nitroso compounds, e.g., N,N'-dinitrosopentamethylenetetramine and N,N'-dimethyl-N,N'-dinitrosoterephthalamide.

Heat-expandable fine particles prepared by encapsulation of a gaseous component such as butane, propane, heptane or the like as a blowing agent are preferred as a blowing agent because of ease of mixing operation. Commercially available heat-expandable fine particles, such as "Microsphere" produced by Matsumoto Yushi K. K., may be used. The particles generally have a particle diameter of 1 to 25 μm, but are used with a narrow particle diameter distribution when used. The object of reducing or losing the adhesiveness upon heat treatment in accordance with the present invention can be attained by using fine particles having a certain average particle diameter. In particular, the object can be securely attained when small particles and large particles, the difference in the average particle diameter between the small particle and the large particle being at least about 3 μm, in more detail, small particles having an average particle diameter of 7 μm or less, preferably 5 μm or less, and large particles having an average particle diameter of 10 μm or more, preferably 15 μm or more, are used such that the amount of the small particles is 50% by weight or less, preferable 1 to 25% by weight, based on the weight of sum of the small and large particles. If desired, a blowing assistant may be used in combination.

The pressure-sensitive adhesive material according to the present invention comprises a support having on at least one side thereof a pressure-sensitive adhesive layer comprising the above-described strippable pressure-sensitive adhesive. Where the pressure-sensitive adhesive layer is provided only one side of a support, a pressure-sensitive adhesive layer comprising a known pressure-sensitive adhesive may be provided on the other side. Further, the adhesive layer comprising the strippable pressure-sensitive adhesive can form an adhesiveness-reduction or elimination treated portion and an untreated portion with a desired pattern according to the use purpose. The treated portion can be formed by, for example, using a masking material or pressing with a heated roll on which a pattern is formed. A modified embodiment of the pressure-sensitive adhesive material is a material wherein at least two adhesive layers comprising the strippable pressure-sensitive adhesive are formed on one or both sides of the support, and two kinds of heat-expandable fine particles having a difference in an expansion initiation temperature (treatment temperature) therebetween of at least 20° C. each is incorporated into the first and second layer, respectively, to form a multi-expansion. The pressure-sensitive adhesive material also includes the embodiment that at least two kinds of heat-expandable fine particles having the expansion initiation temperature difference of at least 20° C. are incorporated into one adhesive layer.

The support which can be used in the present invention includes a plastic film, paper, woven fabric, nonwoven fabric, a metallic foil, a laminate of these sheets, and a foamed sheet. While not limiting, the thickness of the support usually ranges from 5 μm to 5 mm. The adhesive material may have a structure comprising a separator sheet having been rendered releasable with a release agent so that the pressure-sensitive adhesive layer formed thereon may be transferred onto an adherent.

The thickness of the pressure-sensitive adhesive layer formed on a support is decided appropriately. It usually ranges from 1 to 500 μm, and preferably from 5 to 100 μm.

The adhesive material according to the present invention is applicable for preference to various uses requiring easy release from an adherent. For example, it is useful as a surface protective film or sheet or masking film or sheet for prevention of contamination or damage of metallic plates, plastic plates, glass plates, etc. Further, by utilizing those properties, the adhesive material can be advantageously used as a label which can be stripped after establishment of the display purpose.

The adhesive material is also useful as a film or sheet for temporary fixing or just fixing of parts or articles in the production of various articles, such as electronic parts, e.g., solar batteries, thermal heads, printed circuit boards (inclusive of flexible ones), and semiconductor chips. It is further useful as a carrier tape during processing or delivery of parts for holding the parts at prescribed intervals, especially at a given interval. Further, by utilizing the property that the volume of the strippable pressure-sensitive adhesive expands upon heat treatment, the adhesive material can be used as a film or sheet for filling gaps.

Reduction or elimination of adhesiveness of the pressure-sensitive adhesive layer can be effected by causing the blowing agent in the pressure-sensitive layer to expand or blow by heat treatment. Conditions of the heat treatment are selected appropriately according to the blowing characteristics of the blowing agent used, heat resistance of the support used, and the like. The heat treatment may be conducted at any stage according to the end use.

According to the present invention, since the base polymer of the adhesive maintains a high dynamic modulus of elasticity in high temperatures with a small rate of change with temperature, the adhesive is easily re-adhered and is excellent in properties of following the shape of an adherent during forming. In addition, it reduces or, in some cases, loses its adhesiveness on heating.

Accordingly, where the adhesive material having a pressure-sensitive adhesive layer comprising such a strippable pressure-sensitive adhesive is used as, for example, surface protecting material, it undergoes deformation while keeping close contact with an adherent during forming of an adherent, such as drawing, and can be smoothly stripped from the adherent after accomplishment of the purpose of protection, thus bringing about improved working efficiency.

Where the adhesive material is used as, for example, a temporary fixing material, it can be stripped from an adherent without causing damage and, after correction of the position of the adherent, can be re-applied to hold the adherent in a firmly fixed state in the right position. After accomplishing the purpose of fixing, the adhesive material can be stripped off smoothly, thus bringing about improved precision and efficiency in positioning operation.

The present invention is now illustrated in greater detail by way of Examples, but it should be understood that the present invention is not deemed to be limited thereto. All the parts, percentages, and ratios are given by weight unless otherwise indicated.

EXAMPLE 1

In toluene were dissolved 100 parts of an ethyl acrylate/ 2-ethylhexyl acrylate/2-hydroxyethyl acrylate copolymer (50:50:1) having a weight average molecular weight of 600,000 as a base polymer, 5 parts of a polyurethane crosslinking agent, and 20 parts of heat-expandable fine particles ("Microsphere F-301D") to prepare a toluene solution of a strippable pressure-sensitive adhesive.

The solution was coated on one side of a 50 μm thick polyester film to a dry thickness of 40 μm, followed by heat drying to prepare a pressure-sensitive adhesive sheet useful as a surface protective material.

EXAMPLE 2

In toluene were dissolved 100 parts of a butyl acrylate/ acrylic acid/acrylonitrile copolymer (100:5:10) having a weight average molecular weight of 1,200,000 as a base polymer, 1 part of a polyurethane type crosslinking agent and 15 parts of heat-expandable fine particles ("Microsphere F-80SD") to prepare a toluene solution of a strippable pressure-sensitive adhesive.

The solution was coated on both sides of a 25 μm thick polyester film to a dry thickness of 30 μm, followed by heat drying to prepare a pressure-sensitive adhesive sheet useful as a temporary fixing material.

EXAMPLE 3

In toluene were dissolved 100 parts of an acryl-grafted rubber (methyl methacrylate moiety: 20 parts) as a base polymer, 10 parts of a terpene type tackifier resin, 60 parts of a high-softening resin having a glass transition point of 180° C., 2 parts of a vulcanizing agent, and 50 parts of heat-expandable fine particles ("Microsphere F-80SD") to prepare a toluene solution of a strippable pressure-sensitive adhesive.

The solution was coated on one side of a 25 μm thick polyester film to a dry thickness of 30 μm, and a pressure-sensitive adhesive solution having the same composition as described above except for containing no heat-expandable fine particles was coated on the other side to a dry thickness of 30 μm, followed by heat drying to prepare a pressure-sensitive adhesive sheet useful as a fixing material.

COMPARATIVE EXAMPLE 1

A strippable pressure-sensitive adhesive and an adhesive material were prepared in the same manner as in Example 1, except for replacing ethyl acrylate/2-ethylhexyl acrylate copolymer with butyl acrylate/acrylic acid copolymer (100:2) having a weight average molecular weight of 350,000.

COMPARATIVE EXAMPLE 2

A strippable pressure-sensitive adhesive and an adhesive material were prepared in the same manner as in Example 2, except for replacing butyl acrylate/acrylic acid/acrylonitrile copolymer with natural rubber.

The dynamic modulus of elasticity of the base polymers used in the foregoing Examples and Comparative Examples was measured at a measuring temperature varying from ambient temperature up to 150° C. The measurements were made by sandwiching the base polymer in between a pair of plates, rotating one of the plates, and measuring the torque at the other plate.

Each of the strippable pressure-sensitive adhesive materials prepared in Examples 1 to 3 and Comparative Examples 1 to 2 was evaluated according to the following test methods.

1) Adhesive Strength:

The adhesive material was adhered to a stainless steel plate (SUS 304; BA finished), and the peel strength (peel angle: 180°) was measured either at ambient temperature and after heating at 100° C. (Example 1 and Comparative Example 1) or 150° C. (other Examples) for 1 minute in accordance with JIS Z0237.

2) Drawing Processability:

The adhesive material of Example 1 or Comparative Example 1 was adhered to a 0.2 mm thick stainless steel plate, and the plate was shaped by drawing to obtain a container having 20 mm long side walls. The container with the adhesive material was subjected to heat treatment, and the adhesive material was then stripped off.

The state of adhesion between the adhesive material and the stainless steel plate after drawing and the strippability of the adhesive material after heat treatment were evaluated according to the following rating system.

| Excellent | Satisfactory in both close adhesion and strippability |
| --- | --- |
| Good | Satisfactory in either close adhesion or strippability |
| Poor | The support damaged, or the adhesive material broken on stripping |

4) Re-applicability:

Five unsintered ceramic laminated sheets for condenser formation each having a thickness of 1 mm and having printed thereon a prescribed pattern of internal electrodes were once laid up upon each other via the double-coated adhesive material obtained in Example 2 or Comparative Example 2 and then separated apart from each other for correction of the position. Re-applicability for positional correction was evaluated according to the following rating system:

| Excellent | Strippable without causing breakage or damage to the ceramic sheet or laminate. |
| --- | --- |
| Good | Strippable without causing breakage of the ceramic sheet or laminate. |
| Poor | Considerable breakage or damage caused by stripping, making the ceramic sheet laminate useless. |

5) Removability:

The adhesive material obtained in Example 3 was adhered on a carrier via the pressure-sensitive adhesive layer containing no heat-expandable fine particles. Five sheets of the same unsintered ceramic sheet laminates as used above were laid up on the adhesive material, each laminate being bonded via the double-coated adhesive material obtained in Example 2. The assembly as pressed under a pressure of 130 kg/cm$^2$ and then cut deep to pieces of 1.5 mm×2.5 mm while keeping the polyester film of the adhesive material of Example 3 uncut. The assembly with its carrier was heated at 150° C. for 1 minute. The every chip (unsintered ceramic sheet) was then separated apart, and the removability was evaluated as follows.

| Excellent | Removable without causing breakage or damage to each chip |
| --- | --- |
| Good | Removable without causing breakage of each chip |
| Poor | Considerable breakage or damage of the chip caused by the removal, making each chip useless |

The results obtained are shown in the Table below. With respect to the data of dynamic modulus of elasticity, values measured at ambient temperature and 150° C. were shown.

TABLE 1

|  | Example 1 | Example 2 | Example 3 | Compara. Example 1 | Compara. Example 2 |
| --- | --- | --- | --- | --- | --- |
| Dynamic Modulus of Elasticity (× 10$^4$ dyne/cm$^2$): |  |  |  |  |  |
| Ambient Temp. | 180 | 300 | 90 | 110 | 90 |
| 150° C. | 200 | 100 | 60 | 20 | 6 |
| Adhesive Strength (g/20 mm): |  |  |  |  |  |
| Ambient Temp. | 350 | 245 | 130 | 650 | 720 |
| After Heating | 0–10 | 0–10 | 30 | 430 | 870 |
| Gel Content (wt %) | 70 | 85 | 80 | 25 | 35 |
| Drawing Processability | Excellent | — | — | Poor | — |
| Re-applicability | — | Excellent | — | — | Poor |
| Removability | — | Excellent | Excellent | — | — |

While the invention has been described in detail and with reference to specific examples thereof, it will be apparent to one skilled in the art that various changes and modifications can be made therein without departing from the spirit and scope thereof.

What is claimed is:

1. A strippable pressure-sensitive adhesive, comprising: a highly elastic base polymer whose dynamic modulus of elasticity is in the range of from 250,000 to 10,000,000 dyne/cm$^2$ at a temperature between ambient temperature and 150° C., said base polymer having incorporated therein a blowing agent, wherein the adhesive reduces or loses its adhesiveness on expansion or blowing of said blowing agent, and wherein said blowing agent is heat-expandable fine particles, the heat-expandable fine particles comprising first particles and second particles, said first particles having an average particle diameter of less than or equal to 7 µm, and said second particles having an average particle diameter of greater than or equal to 10 µm, wherein said first particles are present in an amount of between about 1 and about 50 weight percent based on the weight of the sum of the first and second particles.

2. A strippable pressure-sensitive adhesive as claimed in claim 1, wherein the adhesive force of the adhesive before heat treatment is at least about 100 g/20 mm.

3. A strippable pressure-sensitive adhesive as claimed in claim 1, wherein the adhesive force of the adhesive after heat treatment is about 300 g/20 mm or less.

4. A strippable pressure-sensitive adhesive as claimed in claim 1, wherein a percentage of adhesiveness reduction is at least about 50%.

5. A strippable pressure-sensitive adhesive as claimed in claim 1, wherein the proportion of the first particles and second particles is such that the amount of the first particles is between about 1 and about 25 weight percent based on the weight of the sum of the first and second particles.

6. A strippable pressure-sensitive adhesive as claimed in claim 1, wherein said blowing agent is present in an amount of from 1 to 100 parts by weight per 100 parts by weight of the base polymer.

7. A strippable pressure-sensitive adhesive as claimed in claim 1, wherein said adhesive has a gel content of at least 40% by weight.

8. An adhesive material, comprising:

a support having on at least one side thereof a strippable pressure-sensitive adhesive layer comprising a highly elastic base polymer whose dynamic modulus of elasticity is in the range of from 250,000 to 10,000,000 dyne/cm$^2$ at a temperature between ambient temperature and 150° C., said base polymer having incorporated therein a blowing agent, wherein the adhesive layer reduces or loses its adhesiveness on expansion or blowing of said blowing agent, and wherein said blowing agent is heat-expandable fine particles, the heat-expandable fine particles comprising first particles and second particles, said first particles having an average particle diameter of less than or equal to 7 μm, and said second particles having an average particle diameter of greater than or equal to 10 μm, wherein said first particles are present in an amount of between about 1 and about 50 weight percent based on the weight of the sum of the first and second particles.

9. An adhesive material as claimed in claim 8, wherein said adhesive material is a surface protective film or sheet.

10. An adhesive material as claimed in claim 8, wherein said adhesive material is a masking film or sheet.

11. An adhesive material as claimed in claim 8, wherein said adhesive material is a temporary fixing film or sheet.

12. An adhesive material as claimed in claim 8, wherein said adhesive material is a fixing film or sheet.

13. An adhesive material as claimed in claim 8, wherein said adhesive material is a carrier tape.

14. An adhesive material as claimed in claim 8, wherein said adhesive material is a seal tape or sheet.

15. An adhesive material as claimed in claim 8, wherein said adhesive material is a label.

16. An adhesive material as claimed in claim 8, wherein said strippable pressure-sensitive adhesive layer is on part of the support.

17. An adhesive material as claimed in claim 8, wherein said strippable pressure-sensitive adhesive layer is composed of a first part having been rendered less adhesive or non-adhesive and a second part not having been rendered less adhesive or non-adhesive.

18. An adhesive material as claimed in claim 8, wherein said strippable pressure-sensitive adhesive layer is composed of at least two layers each containing a blowing agent different in blowing temperature.

19. An adhesive material as claimed in claim 8, wherein said strippable pressure-sensitive adhesive layer contains at least two blowing agents having a difference in blowing temperature of at least 20° C.

* * * * *